United States Patent
Hein

(10) Patent No.: US 11,335,915 B2
(45) Date of Patent: May 17, 2022

(54) ACTIVATION MECHANISM FOR A BATTERY FOR AN ELECTRONIC IGNITION MECHANISM AND A BATTERY

(71) Applicant: DIEHL & EAGLE PICHER GMBH, Roethenbach (DE)

(72) Inventor: Roland Hein, Nuremberg (DE)

(73) Assignee: Diehl & Eagle Picher GmbH, Roethenbach (DE)

( * ) Notice: Subject to any disclaimer, the term of this patent is extended or adjusted under 35 U.S.C. 154(b) by 0 days.

(21) Appl. No.: 16/899,877

(22) Filed: Jun. 12, 2020

(65) Prior Publication Data

US 2020/0395620 A1  Dec. 17, 2020

(51) Int. Cl.
*H01M 6/38* (2006.01)
*H01M 6/32* (2006.01)

(52) U.S. Cl.
CPC ............ *H01M 6/38* (2013.01); *H01M 6/32* (2013.01)

(58) Field of Classification Search
CPC ...... H01M 6/30; H01M 6/36–38; F16F 1/027; F16F 1/18
See application file for complete search history.

(56) References Cited

U.S. PATENT DOCUMENTS

| | | | | |
|---|---|---|---|---|
| 2,656,401 A * | 10/1953 | Everett | ................... | H01M 6/38 429/114 |
| 2,918,516 A | 12/1959 | Everett | | |
| 6,673,486 B2 | 1/2004 | Ruedenauer et al. | | |
| 2002/0034681 A1* | 3/2002 | Rudenauer | ............. | H01M 6/38 429/114 |
| 2004/0197640 A1 | 10/2004 | Straver | | |
| 2013/0152811 A1* | 6/2013 | Rastegar | ............... | F42C 11/008 102/216 |
| 2020/0006785 A1 | 1/2020 | Hein | | |

FOREIGN PATENT DOCUMENTS

| | | |
|---|---|---|
| DE | 10038066 A1 | 3/2002 |
| DE | 102018005202 A1 | 1/2020 |
| EP | 1467423 A2 | 10/2004 |
| EP | 3382782 A1 | 10/2018 |
| JP | S57135074 U | 8/1982 |
| JP | 58161248 A * | 9/1983 ............. H01M 6/38 |

OTHER PUBLICATIONS

Machine Translation of Miura et al. (JP 58-161248), Published Sep. 24, 1983. (Year: 1983).*

* cited by examiner

*Primary Examiner* — Jonathan Crepeau
*Assistant Examiner* — Jacob Buchanan
(74) *Attorney, Agent, or Firm* — Laurence A. Greenberg; Werner H. Stemer; Ralph E. Locher

(57) ABSTRACT

An activation mechanism for a battery for an electronic ignition mechanism contains an ampoule filled with an electrolyte. The mechanism for breaking has a snap spring element to which the ampoule is attached in a freely suspended manner. The snap spring element snaps from a first shape into a second shape when a force due to acceleration is applied, thereby severing the attachment of the ampoule.

19 Claims, 3 Drawing Sheets

ACTIVATION MECHANISM FOR A BATTERY FOR AN ELECTRONIC IGNITION MECHANISM AND A BATTERY

CROSS-REFERENCE TO RELATED APPLICATION

This application claims the priority, under 35 U.S.C. § 119, of German patent application DE 10 2019 004 140, filed Jun. 12, 2019; the prior application is herewith incorporated by reference in its entirety.

BACKGROUND OF THE INVENTION

Field of the Invention

The invention relates to an activation mechanism for a battery for an electronic ignition mechanism containing an ampoule filled with an electrolyte and a mechanism for breaking the ampoule.

An activation mechanism of this kind is used to activate a battery for an electronic ignition mechanism of a projectile which can be fired through a weapon barrel. Upon firing, the activation mechanism is actuated in such a manner that the ampoule is broken and the electrolyte electrically activates the neighboring battery cells.

An activation mechanism of this kind is known from published, European patent application EP 1 467 423 A2, corresponding to U.S. patent publication No. 2004/0197640, for example. This activation mechanism is only actuated at very high accelerations greater than 3000 times the acceleration due to gravity; depending on the design, the activation mechanism can also withstand up to 5000 times the acceleration due to gravity. The activation mechanism known from published, European patent application EP 1 467 423 A2 envisages in a first variant that the ampoule containing the electrolyte should be mounted on a preferably annular bearing element which is connected by a few narrow connecting struts to a carrier which is arranged inside the annular bearing element and is therefore positioned below the ampoule. If the projectile is then fired, because of the acceleration a high force acts on the ampoule and via this on the bearing element, which leads to the connecting struts being sheared off and the ampoule being released so that it strikes against the carrier, which leads to the breaking of the ampoule and therefore activation of the battery. In order to achieve this actuation, a "trigger threshold" has to be crossed and therefore a sufficient force action needs to be achieved by the firing acceleration, so that the connecting struts are sheared off and the ampoule is broken.

A second variant known from published, European patent application EP 1 467 423 A2 envisages bonding the ampoule to a trigger system so that the ampoule is contained in the housing in an almost freely suspended manner. The trigger system contains a suspension device to which the ampoule is adhered, wherein the suspension device is contained in the housing on a corresponding carrier. For activation at a sufficiently high acceleration, the adhesive joint of the ampoule to the suspension mechanism may be broken, so that the ampoule falls and strikes against an element which breaks it. Alternatively, the suspension mechanism may also be released from its suspension in the housing, as a result of which the ampoule can likewise be released.

While in the case of the first embodiment, the insertion of the annular bearing element means that there is only a relatively small distance to the carrier causing the breaking, which can have a negative impact on the breaking process, the second variant is very costly to produce.

A further embodiment of an activation mechanism of this kind is known from published, non-prosecuted German patent application DE 100 38 066 A1, corresponding to U.S. Pat. No. 6,673,486. This is particularly provided for relatively low activation accelerations, in other words, the trigger threshold is about 1000-2000 times the acceleration due to gravity. The low trigger threshold makes it necessary to ensure that activation is not accidentally initiated when the projectile weapon is dropped.

To this end, a timing element is provided which is used to evaluate the duration of the impulse acting on the battery in each case, wherein the timing element may be a mechanical, hydraulic or pneumatic timing element. In the case of a free fall onto a hard surface, the duration of the impulse is in the micro-second range, while in the case of firing from a weapon barrel, the impulse duration is in the millisecond range. In the case of the activation mechanism described there, the activation mechanism only evaluating the acceleration variable hitherto is therefore replaced by an activation mechanism evaluating the impulse duration. This activation mechanism is also structurally complex.

SUMMARY OF THE INVENTION

The problem on which the invention is based is therefore that of specifying a simply structured activation mechanism which is improved in comparison therewith.

In order to solve this problem, it is proposed according to the invention that in the case of an activation mechanism of the kind referred to above, the breaking mechanism contains a snap spring element to which the ampoule is attached in a freely suspended manner, wherein the snap spring element snaps from a first shape into a second shape when a force due to acceleration is applied, thereby severing the attachment of the ampoule.

In the case of the activation mechanism according to the invention, the ampoule is mounted in the housing in a freely suspended manner, in other words it is not mounted on a bearing ring or a support or the like. Instead, there is a sufficient distance, and therefore adequate movement space, in the direction of an element breaking the ampoule. Moreover, a simple snap spring element on which the ampoule is suspended is used as the trigger mechanism. This snap spring element can snap between a first shape and a second shape, wherein it can adopt the respective shape permanently. The snapping process can be triggered by applying a force; in other words, if firing through a barrel causes a sufficiently large acceleration and therefore a sufficiently large impulse acts on the projectile and consequently a sufficiently large force also acts on the snap spring element, the snap spring element changes its shape from the first shape in which the ampoule is fixed into the second shape in which the ampoule is released. In this shape, the ampoule drops against the breaking element in the housing and is shattered.

The activation mechanism according to the invention is very simple in design, which makes it easy to produce. Nevertheless, there is a high degree of functional reliability, firstly when it comes to reaching and observing a correspondingly high trigger threshold which can easily be set by an appropriate design of the snap spring element, but secondly also in respect of reliable breaking of the ampoule.

For a simple coupling of the snap spring element with the ampoule, according to an advantageous development of the invention at least two holding arms are provided on the snap spring element which are coupled in the first shape of the snap spring element with a holding element provided on the ampoule, which coupling is released during the snapping process into the second shape by a movement of the holding elements. Through these movable holding arms, a mechanical coupling is easily achieved which is also reliably released during the snapping process.

A holding plate with which the arms engage or beneath which the holding arms grip is preferably fastened to the ampoule as the holding element, wherein the holding plate is preferably adhered to the ampoule. This holding plate therefore represents the mechanical interface with the holding arms, wherein the holding arms preferably engage with the outer edge of the holding plate and move laterally outwardly during the snapping process. A lateral under-grip is therefore provided in the first shape of the snap spring element which is released by a lateral movement of the holding arms. Alternatively, it is conceivable for the holding plate also to be provided with a central bore through which the holding arms grip by under-gripping the holding plate around the inner circumference, wherein in this embodiment the holding arms then move inwardly during the snapping process.

More than two holding arms arranged equidistantly distributed around the rounded snap spring element are preferably provided, so that there is a multiple mechanical under-grip, wherein all holding arms are naturally released synchronously during the snapping process from the under-grip, releasing the holding plate and therefore the ampoule.

In a development of the invention, the snap spring element may have a snap-over bearing portion with which the ampoule is coupled, in particular via the holding arms formed on the bearing portion, and to which a mass element movable due to acceleration is assigned which is movable due to acceleration against the bearing portion and triggers the snapping process. The mass element acts almost as an impulse generator for initiating the snapping process, in that it is movable against the bearing portion due to acceleration, as a result of which the snapping process is initiated.

In this case, the bearing portion in the first shape may be formed rising to the mass element and in the second shape falling from the mass element. In other words, the bearing portion is shaped as a truncated cone, possibly slightly arched, wherein the truncated cone geometry snaps over from one direction to the other during the snapping process.

A practical development envisages that the mass element is supported by the bearing portion via at least one spring element that can be compressed via the mass element due to acceleration. This at least one spring element is prestressed according to the calculated trigger threshold and supports the mass element on the bearing portion. During acceleration, the mass element compresses the spring element until it comes into contact in the bearing portion. If the acceleration increases still further, from the calculated acceleration point the snap-over region, in other words the bearing portion, is slightly deformed and pressed-in until the snapping process is suddenly triggered, so when the trigger point is reached and consequently the bearing portion snaps over downwardly. In this case, the holding arms then move outwardly and release the holding plate.

The spring element is preferably annular with the mass element extending into the annular spring element, in other words extending in the direction of the bearing portion. The annular spring element is preferably formed by one or multiple crinkle spring washers.

According to a practical development of the invention, the mass element or, insofar as a spring element is also provided, the mass element and the prestressed spring element are fixed to the snap spring element. This fixing allows the spring element to be correspondingly prestressed, in other words to be compressed slightly via the mass element.

For fixing, according to a particularly practical development of the invention, the snap spring element for holding the mass element or the mass element and spring element may exhibit at least two fixing arms formed on the bearing portion which extend to the side of the mass element, or the mass element and the spring element, and engage over the mass element. These fixing arms therefore allow a simple mechanical fixing of the mass element and, insofar as provided, also of the spring element, including in the prestressed state, so that a simply configured, compact unit results. In this case, more than two fixing arms arranged distributed equidistantly over the rounded snap spring element are preferably also provided.

The particular advantage of a snap spring element of this kind is that it is an integral element which has all the relevant components, namely the holding arms, the snap-over bearing portion and the fixing arms. The snap spring element is preferably made of sheet metal, preferably of spring steel, so it can be produced as a simple metal sheet component using a simple stamping and bending process. In this case, the holding arms and the fixing arms are preferably provided alternately to one another on the snap spring element. Both are formed on the bearing portion but they extend on different sides of the bearing portion.

Assembly is extremely simple in this case. In order to assemble the spring element and the mass element, these need only be pressed from above into the fixing arms arranged virtually annularly about the circumference of the bearing portion; in the end position the fixing arms snap automatically into the overlap via the mass element. The bearing portion is located in the second position in which the holding arms are guided outwardly. For fitting to the ampoule, the snap spring element is then simply pressed against the holding plate, so that the downwardly conically projecting bearing portion runs against the holding plate and, if there is sufficient pressure, snaps over into the first shape again. In this case, the holding arms snap inwardly again and grip beneath the holding plate.

In order to fix the equipped snap spring element in the housing of the activation mechanism, a cage-like carrier is conveniently provided on the housing side, to which carrier the snap spring element is fitted, wherein it is supported by the cage-like carrier with the fixing arms extending further outwardly, viewed radially, the fixing arms projecting further outwards than the holding arms. The ampoule which is held suspended in the housing or in the carrier extends into the carrier. The cells to be activated via the electrolyte after the ampoule has been broken are provided on the outside about the carrier.

Apart from the activation mechanism itself, the invention further relates to an activatable battery for an electronic ignition mechanism comprising an activation mechanism of the kind described above.

Other features which are considered as characteristic for the invention are set forth in the appended claims.

Although the invention is illustrated and described herein as embodied in an activation mechanism for a battery for an electronic ignition mechanism, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
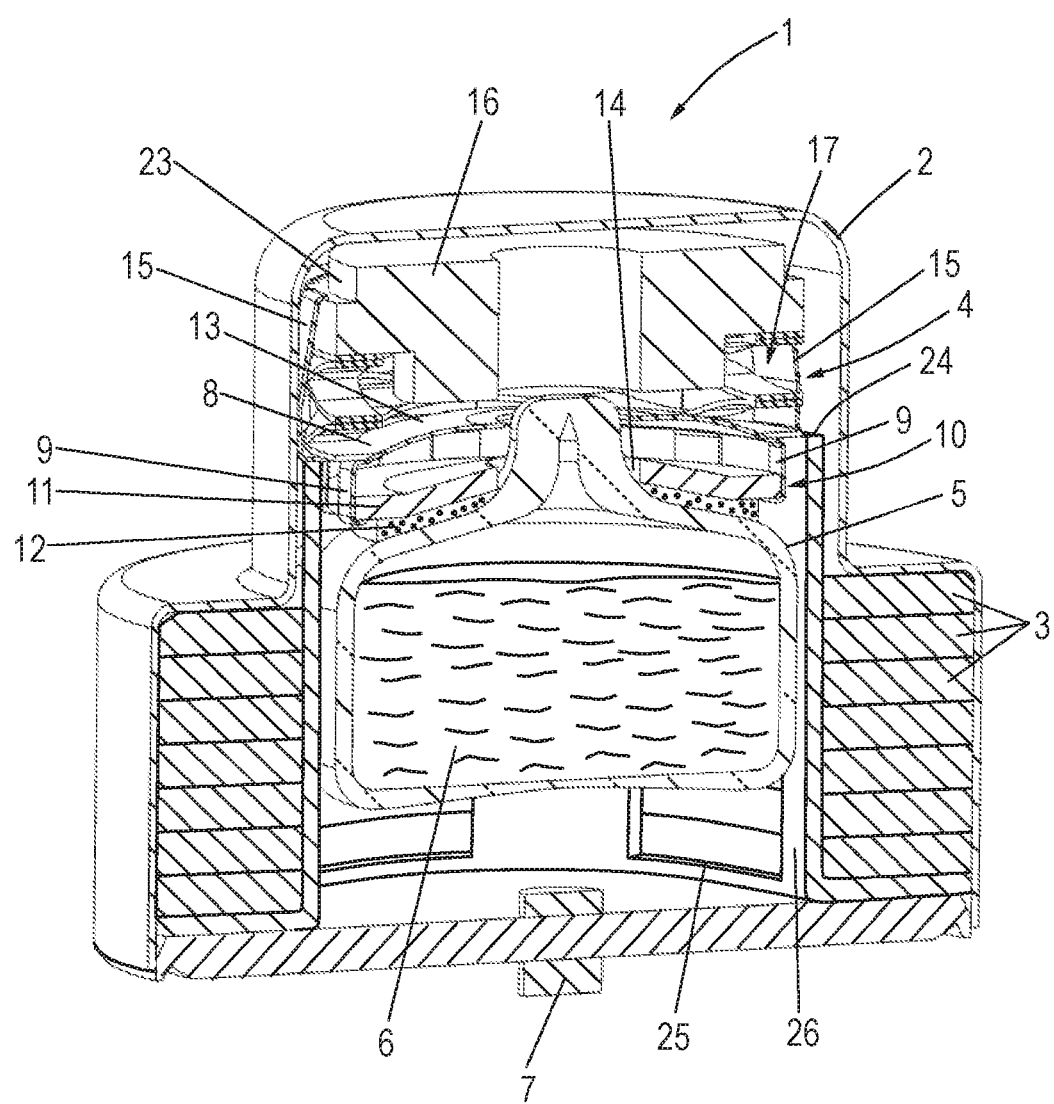
FIG. 1 is a diagrammatic, perspective, sectional view of an activation mechanism according to the invention.

Referring now to the figures of the drawings in detail and first, particularly to FIG. 1 thereof, there is shown a perspective, sectional view of a battery 1 according to the invention containing a housing 2 in which a cell-stack containing multiple, for example seven, cells 3 which have to be activated electrically by an electrolyte are contained on the peripheral side and only basically depicted in this case.

In order to activate the battery, an activation mechanism 4 according to the invention is provided which is used to release in a defined manner an ampoule 5 in which the electrolyte 6 used for activation is contained, so that the ampoule strikes against a breaking element 7 and is broken, allowing the electrolyte 6 to flow in the region of the cells 3, activating said cells.

The activation mechanism 4 contains a snap spring element 8 for this purpose, to which the ampoule 5 is attached in a freely suspended manner. The snap spring element 8 may snap over due to acceleration from a first shape, in which the ampoule 5 is fixed in a suspended manner, into a second shape, in which the ampoule 5 is released and can strike against the breaking element 7.

Figure 3:
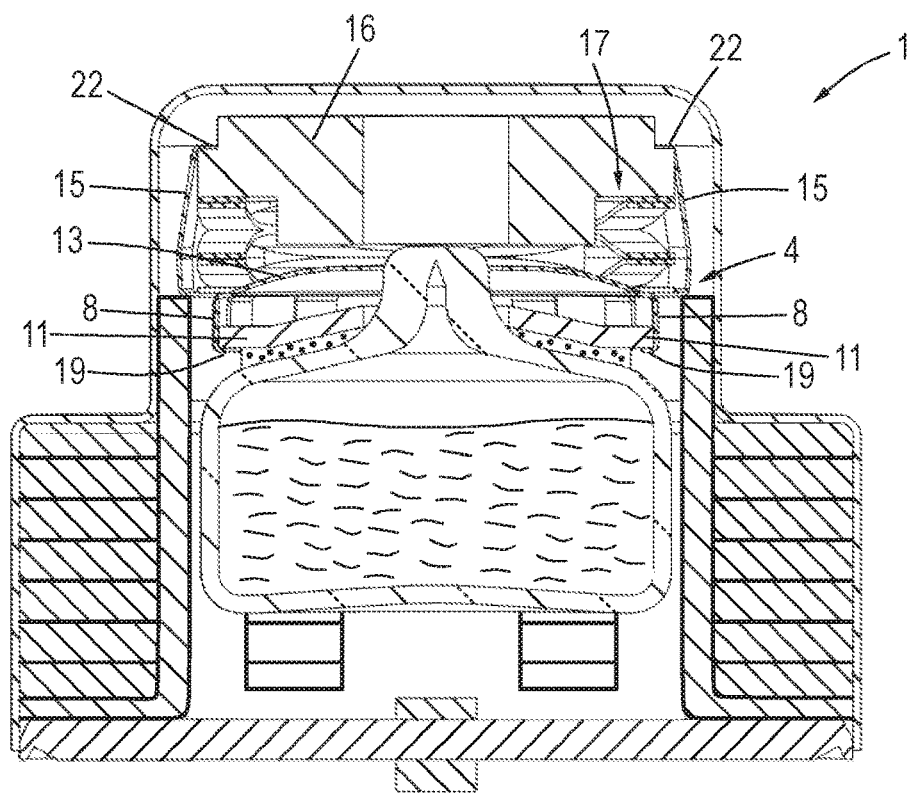
FIG. 3 is a sectional view of the activation mechanism in a non-triggered state.

A plurality of holding arms 9 is provided on the snap spring element 8 which, in the non-triggered position shown in FIGS. 1 and 3, grip beneath a holding element 10 in the form of a holding plate 11 in this case which is connected to the ampoule 5 via an adhesive joint 12 on the outer edge of the plate, so that the ampoule 5 is virtually suspended from the holding arms 9.

The holding arms 9 are integrally formed on a bearing portion 13 which is shaped as a truncated cone and is slightly arched and virtually extends away from the ampoule 5 in the non-activated position. The bearing portion 13 causes the snapping. The ampoule 5 engages through the bearing portion 13 in a central bore 14.

Fixing arms 15 are furthermore formed on the bearing portion 13 and extend to the opposite side like the holding arms 9. They are used to fix a mass element 16 and also a spring element 17, which spring element 17 is mounted on the bearing portion 13. The mass element 16 is therefore supported on the bearing portion 13 via the spring element 17. The spring element 17 in the example shown contains a plurality of annular crimped springs which are arranged above one another.

Figure 2:
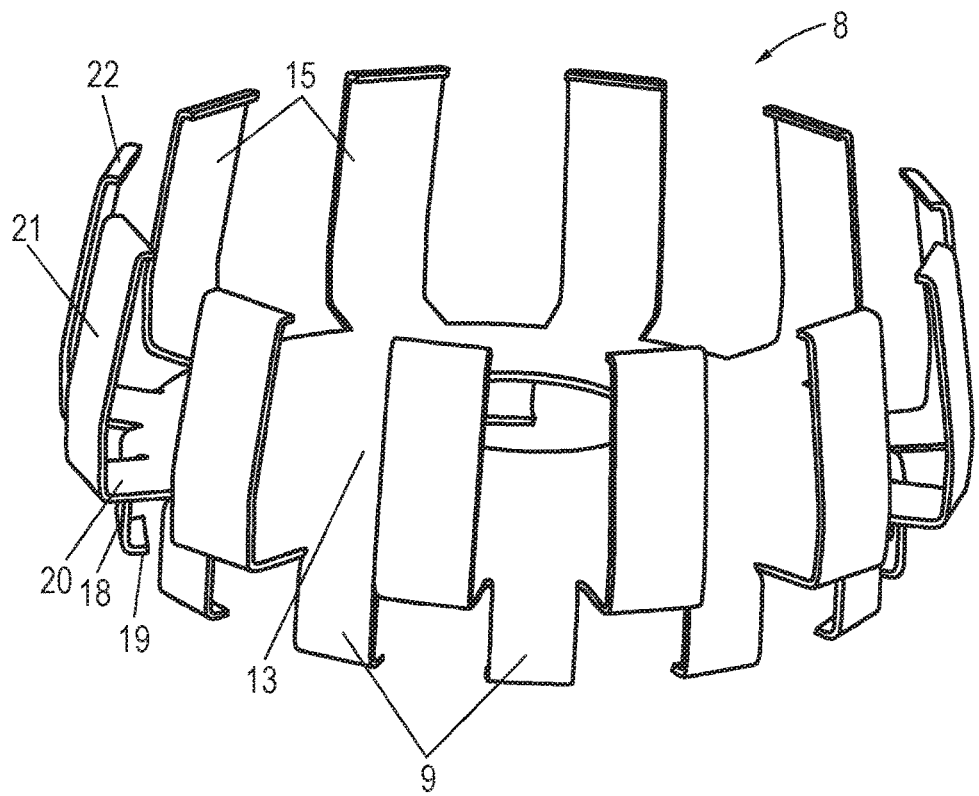
FIG. 2 is a perspective view of a snap spring element.

FIG. 2 shows in an enlarged schematic diagram of the snap spring element 8. This shows the central, plate-shaped bearing portion 13. The holding arms 9 extend towards the underside of said bearing portion, the holding arms only extending slightly radially to the side and consequently changing into virtually axially downwardly extending portion 18 which is angled at the lower end and changes into an under-gripping portion 19. With this under-gripping portion 19, each holding arm 9 grips beneath the holding plate 11. It can clearly be seen here that a plurality of holding arms 9 is arranged distributed equidistantly about the periphery of the bearing portion 13.

The fixing arms 15 extend on the other side of the bearing portion 13. They extend with a radial portion 20 substantially further to the side of the bearing portion 13 than the holding arms 9. The radial portion 20 changes into an axial portion 21 which is slightly inwardly curved and which changes into a wraparound portion 22. With this wraparound portion 22, each fixing arm 15 grips around the mass element 16 which has a circumferential rebate 23 for this purpose, see FIG. 1.

As is furthermore shown in FIG. 1, a cage-like carrier 26 is contained in the housing 2, on which carrier the cells 3 are supported, on the one hand, but on which the activation mechanism 4 is also supported, on the other, via the fixing arms 15 projecting relatively far to the side or else the radial portions 20 thereof. These radial portions 20 rest on the upper end face 24 of the carrier 26 which has corresponding through-holes 25 from which the electrolyte can flow in the region of the cells 3.

The snap spring element 8 is shown in the first shape in FIG. 2. If it snaps over into the second shape, the truncated cone-like bearing portion 13 which extends in this shape in the direction of the fixing arms 15 would extend in the opposite direction, so in the direction of the holding arms 9. Due to the snap-over process, the geometry of the bearing portion 13 changes in such a manner that the holding arms 9 attached thereto are pivoted radially outwardly at their lower end, in other words the under-gripping portions 19. In this case, they release the holding plate 11 so that the ampoule 5 is released. By snapping over, the geometry of the fixing arms 15 would also be changed in theory, they would be moved virtually radially inwardly, which, however, takes place only slightly, if at all, due to the fixing to the mass element 16.

Figure 4:
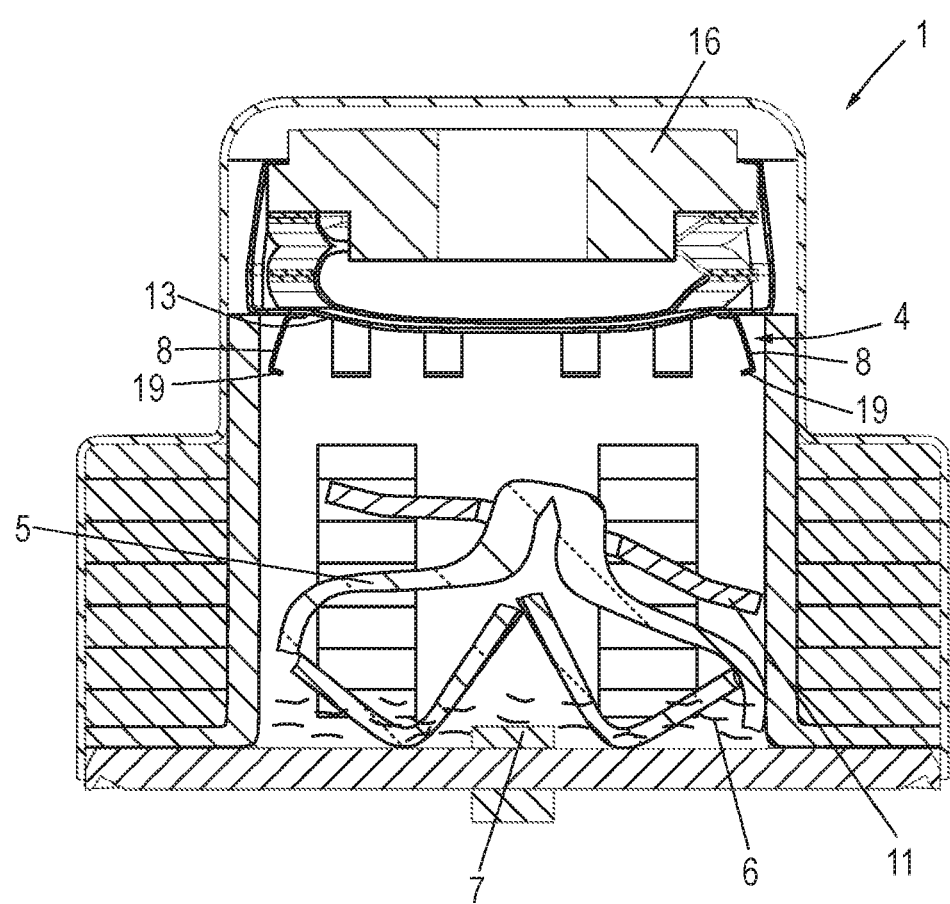
FIG. 4 is a sectional view of the activation mechanism from FIG. 3 in a triggered state.

FIGS. 3 and 4 show two sectional views of the battery 1 or the activation mechanism 4 from FIG. 1. FIG. 3 shows the activation mechanism 4 in the non-activated position in this case, so in the locking position, while FIG. 4 shows the activation mechanism 4 in the release position.

As shown in FIG. 4, the holding arms 9 grip beneath the holding plate 11 at the edge with the under-gripping portions 19. The bearing portion 13 is evidently in the form of a truncated cone and is arched slightly upwardly, so slightly prestressed via the mass element 16 and the spring element 17. The fixing arms 15 engage over the mass element 16 with their over-engaging portions 22, so that the mass element compresses the spring element 17 containing the multiple annular crinkle springs and tensions them against the bearing portion 13.

If a projectile in which the battery 1 is incorporated is fired, the projectile and therefore the battery 1 too will be greatly accelerated. When a sufficient acceleration threshold is reached which, depending on the arrangement of the snap-over process of the snap spring element 8, may be more or less high, the force or else the pressure exerted by the mass element 16 on the bearing portion 13 is so great that the bearing portion is pressed downwardly. When a corresponding trigger point is reached, the bearing portion 13 snaps over, starting from the first shape shown in FIG. 3 into the second shape shown in FIG. 4. The bearing portion 13 arches downwardly in this shape. At the same time, the holding arms 9 in this case are bent out radially to the side. In this case, the under-gripping portions 10 move from their under-grip beneath the holding plate 11, so that the holding plate 11 is released and the ampoule 5 drops downwardly and strikes against the breaking element 7, as a result of which is ruptures, as shown in FIG. 4. This causes the electrolyte 6 to flow out and reach the region of the cells 3, thereby activating them.

LIST OF REFERENCE NUMBERS

1 Activation mechanism
2 Housing
3 Cell
4 Activation mechanism
5 Ampoule
6 Electrolyte
7 Breaking element
8 Snap spring element
9 Holding arm
10 Holding element
11 Holding plate
12 Adhesive joint
13 Bearing portion
14 Bore
15 Fixing arm
16 Mass element
17 Spring element
18 Portion
19 Under-gripping portion
20 Radial portion
21 Axial portion
22 Wraparound portion/over-engaging portion
23 Rebate
24 End face
25 Through-hole
26 Carrier

The invention claimed is:

1. An activation mechanism for a battery for an electronic ignition mechanism, the activation mechanism comprising:
   an ampoule filled with an electrolyte; and
   a mechanism for breaking said ampoule, said mechanism for breaking having a snap spring element to which said ampoule is attached in a freely suspended manner, wherein said snap spring element snaps from a first shape into a second shape when a force due to acceleration is applied, thereby severing an attachment of said ampoule.

2. The activation mechanism according to claim 1,
   further comprising a holding element disposed on said ampoule; and
   wherein said snap spring element having at least two holding arms which are coupled in the first shape of said snap spring element with said holding element of said ampoule, which coupling is released during a snapping process into the second shape by a movement of said holding element.

3. The activation mechanism according to claim 2, wherein said holding element is a holding plate, said holding arms at least one of engaging with said holding plate or gripping beneath said holding plate.

4. The activation mechanism according to claim 3, wherein said holding plate adheres to said ampoule.

5. The activation mechanism according to claim 3, wherein said holding arms engage with an outer edge of said holding plate and move laterally outwardly during the snapping process.

6. The activation mechanism according to claim 2, wherein said at least two holding arms are two of a plurality of holding arms disposed equidistantly distributed around said snap spring element being a rounded snap spring element.

7. The activation mechanism according to claim 2,
   further comprising a mass element movable due to acceleration; and
   wherein said snap spring element has a snap-over bearing portion with which said ampoule is coupled, and to said snap spring element, said mass element is movable due to acceleration against said snap-over bearing portion and triggers the snapping process.

8. The activation mechanism according to claim 7, wherein said snap-over bearing portion in the first shape is formed rising to said mass element and in the second shape falling from said mass element.

9. The activation mechanism according to claim 7, further comprising at least one spring element, wherein said mass element is supported by said snap-over bearing portion via said at least one spring element that can be compressed via said mass element due to acceleration.

10. The activation mechanism according to claim 9, wherein said at least one spring element is an annular spring element with said mass element extending into said annular spring element.

11. The activation mechanism according to 10, wherein said annular spring element is formed by at least one crinkle spring washer.

12. The activation mechanism according to claim 9, wherein said mass element or said mass element and said at least one spring element being a prestressed spring element are fixed to said snap spring element.

13. The activation mechanism according to claim 12, wherein:
    said snap spring element has at least two fixing arms formed on said snap-over bearing portion which extend to a side of said mass element and engage over said mass element; or
    said snap spring element has at least two fixing arms formed on said snap-over bearing portion which extend to a side of said mass element and said at least one spring element, and engage over said mass element.

14. The activation mechanism according to claim 13, wherein said two fixing arms are two of a plurality of fixing arms disposed equidistantly distributed around said snap spring element being a rounded snap spring element.

15. The activation mechanism according to claim 13, wherein said holding arms and said fixing arms are provided alternately to one another on said snap spring element.

16. The activation mechanism according to claim 2,
    further comprising a mass element movable due to acceleration; and
    wherein said snap spring element has a snap-over bearing portion with which said ampoule is coupled to said snap spring element by said holding arms formed on said snap-over bearing portion, and said mass element is movable due to acceleration against said snap-over bearing portion and triggers the snapping process.

17. The activation mechanism according to claim 1, further comprising a cage-shaped carrier, wherein said snap spring element is supported by said cage-shaped carrier into which said ampoule extends.

18. An activatable battery for an electronic ignition mechanism, comprising:

an activation mechanism according to claim 1.

19. An activation mechanism for a battery for an electronic ignition mechanism, the activation mechanism comprising:

an ampoule filled with an electrolyte; and a mechanism for breaking said ampoule, said mechanism for breaking having a snap spring element including a plurality of holding arms to which said ampoule is attached in a freely suspended manner by said plurality of holding arms over a breaking element, wherein said snap spring element snaps from a first shape into a second shape when a force due to acceleration is applied, thereby severing an attachment of said ampoule to said holding arms, thus releasing the ampoule to strike the breaking element.

\* \* \* \* \*